Patented Feb. 21, 1933

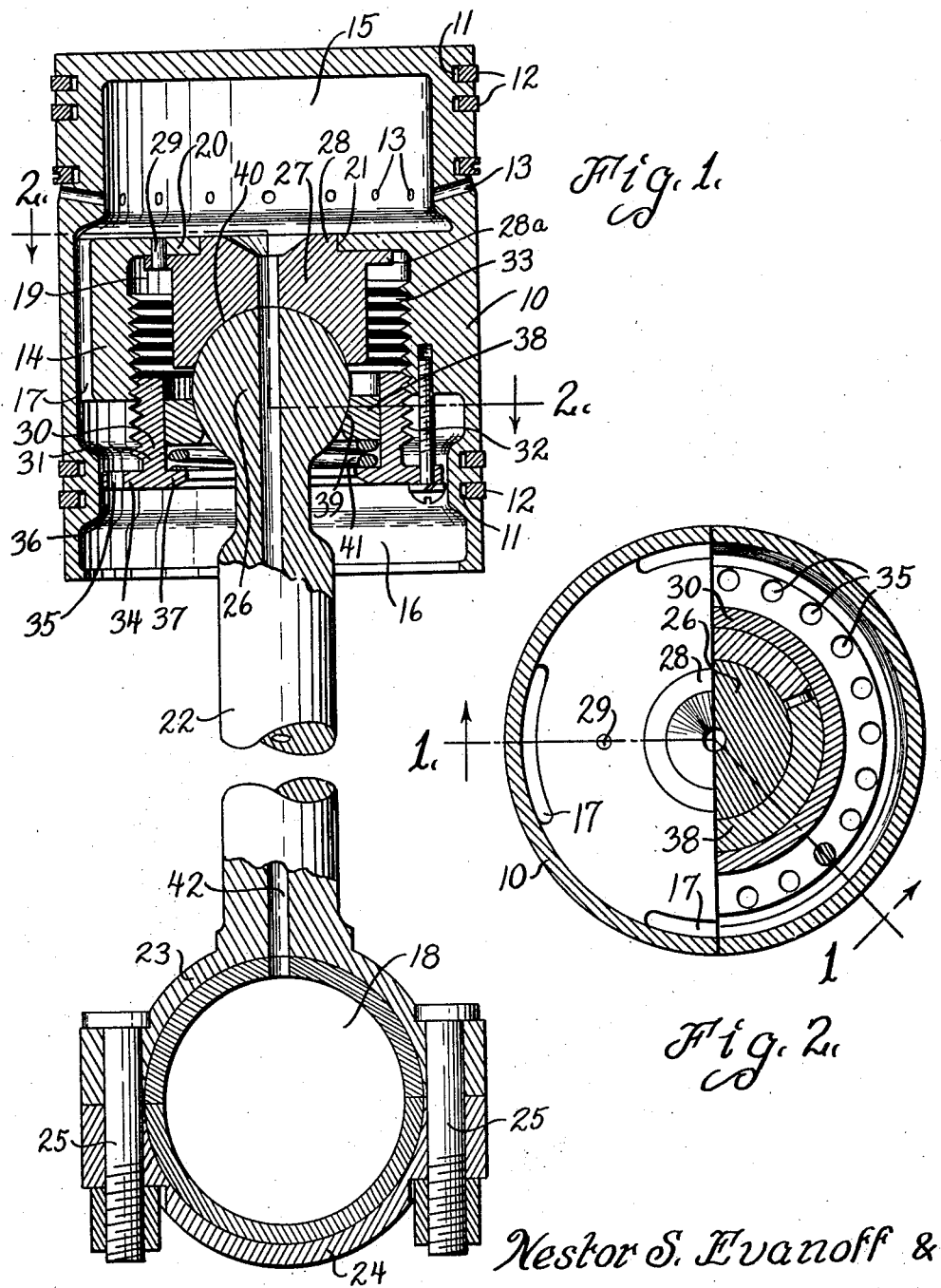

1,898,872

UNITED STATES PATENT OFFICE

NESTOR S. EVANOFF AND STEVE DOICHINOFF, OF CHICAGO, ILLINOIS

PISTON AND MEANS FOR CONNECTING THE CONNECTING ROD THERETO

Application filed February 7, 1930. Serial No. 426,648.

This invention relates to certain novel improvements in pistons and means for connecting the connecting rod thereto, and has for its principal object the provision of an improved construction of this character which will be highly efficient in use and economical in manufacture.

Among the several objects of this invention is to provide a piston structure having a simple and efficient arrangement for connecting the connecting rod thereto which will result in the connecting rod being self-aligned with respect to the piston.

A still further object of the invention is the provision of a piston and connecting rod therefor having a simple and efficient arrangement for lubricating the movable parts of the piston and connecting rod.

A still further object of the invention resides in a simple and efficient arrangement for taking up wear between the connecting parts which connect the piston to the connecting rod.

Other objects will appear hereinafter.

The invention consists in the novel combination and arrangement of parts to be hereinafter described and claimed.

The invention will be best understood by reference to the accompanying drawing showing the preferred form of construction and in which:

Fig. 1 is a vertical sectional detail view of the piston and connecting rod embodied in the invention taken substantially on the line 1—1 of Fig. 2; and Fig. 2 is a sectional detail view taken substantially on the line 2—2 of Fig. 1.

Referring more particularly to the drawing in which the preferred form of construction is shown, our invention includes a piston 10 having the usual spaced grooves 11 and rings 12 mounted in the grooves 11 for reasons well understood in the art. The piston is of semi-hollow construction, and is provided with a plurality of circumferentially disposed openings 13 which admit oil to the cylinder walls of the motor block. The piston as shown is provided with an integral body or block 14 which divides the interior of the piston into an upper compartment 15 and a lower compartment 16. The openings 13 have communication as shown with the upper compartment 15. Formed in the block 14 adjacent the cylindrical wall of the piston is a vertical groove 17 which has communication with the compartments 15 and 16 whereby oil splashed by operation of the crank shaft 18 will be admitted through the groove 17 into the compartment 15.

This block 14 is provided with a centrally located bore 19, the upper end of which is closed by a wall 20. This wall 20 has a centrally located opening 21 which communicates with the bore 19 as shown. The connecting rod is indicated at 22 and includes the usual bearing cap 23 formed integrally with the rod 22 and adapted for connection with the removable bearing cap 24 by means of the usual nut bearing bolts 25.

The upper end of the connecting rod is provided with a ball shaped head 26 which is connected to the piston for universal movement in the following manner. A cap, which includes the upper part of a ball joint connection, is indicated at 27, and this cap is provided with a boss 28 which projects into the opening 21. The cap provides an annular flange 28a which bears against the wall 20, and there may be provided between this flange and the wall 20 a connection by means of pins 29 to prevent rotation of this cap.

The lower element of the ball joint includes a take-up ring 30. This ring 30 includes a sleeve 31 threaded externally as at 32 for threaded engagement with the internal threads 33 of the bore 19. The ring 30 includes an annular flange 34 having formed therein a plurality of circumferentially disposed openings 35, and this flange is spaced from the adjacent wall 36 of the piston so as to permit the passage of oil upwardly to the groove 17. The take-up ring further includes an interior flange 37 which provides a seat for reasons hereinafter set forth.

Arranged in the sleeve 31 is a split bearing ring 38 which has an interior edge beveled to provide a seat 39 for the ball 26 at its lower portion. The cap 27 likewise has an end seat 40 formed therein for the upper end portion of the ball 26. The parts thus described provide a universal connection between the connecting rod and the piston 10, some of the advantages resulting therefrom being hereafter set forth.

It is a known fact that in a universal connection there is a likelihood of a slight degree of wear, and to prevent looseness resulting from this wear between the parts providing this universal connection, we mount upon the flange 37 a compression spring 41 which has the necessary degree of resiliency to take up any loose play resulting from the wear between the movable parts of the universal connection. As shown, this spring rests upon the flange 37 beneath the bearing collar 38, and as will be obvious the spring in bearing engagement with this bearing collar will tend to bear the ball 26 against the cap 27. In this manner knocks between the ball 26 and the universal connection are eliminated.

As shown, the connecting rod has formed therein a longitudinal bore 42 which communicates at its lower end with the interior of the bearing caps and at its upper end with the compartment 15 whereby oil splashed into this compartment will be drained through this bore to lubricate the ball 26 in its socket provided by the seats 39 and 40 and to lubricate the crank of the crank shaft to which the bearing caps are connected.

To illustrate one of the many advantages of our invention, it is pointed out that in some instances a bearing knock results from the fact that the connecting rod is not properly aligned with the piston where the connecting rod is connected to the piston by means of a wrist pin. Should the connecting rod involved in our invention be out of alignment with the piston, the universal connection between the connecting rod and piston will permit the rod to take the proper aligned position. In this way the usual bearing knocks resulting from this situation are eliminated. Again by the use of a universal connection between the connecting rod and the piston it might be said to be of a floating type. In other words, it may assume a proper position relative to the walls of the cylinder in which it operates, thus preventing what is commonly known as warping of the cylinder walls or shaping the cylinder walls egg-shaped. From the description herein taken in connection with the accompanying drawing, it is obvious that we provide a piston and connecting rod with a connection therebetween which is simple in structure and highly efficient in use.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. Means for providing universal connection between a connecting rod and a piston comprising a ball formed on the connecting rod, a block formed in the piston, a bearing cap confined in the block and providing a seat for the upper portion of the ball, a take-up ring adjustably carried by the block and including an internal annular shoulder, a bearing collar confined in the take-up ring and providing a seat for the lower portion of the ball, and yieldable means arranged between the bearing collar and said shoulder for holding the ball in bearing engagement in the seats provided by the bearing cap and the bearing collar.

2. Means for providing universal connection between a connecting rod and a piston comprising a ball formed on the connecting rod, a block formed in the piston, a bearing cap confined in the block and providing a seat for the upper portion of the ball, a take-up ring adjustably carried by the block and including an internal annular shoulder, a bearing collar confined in the take-up ring and providing a seat for the lower portion of the ball, and a spring member arranged between the bearing collar and said shoulder for holding the ball in bearing engagement in the seats provided by the bearing cap and the bearing collar.

3. Means for providing universal connection between a connecting rod and a piston comprising a ball formed on the connecting rod, a block formed in the piston, a bearing cap confined in the block and providing a seat for the upper portion of the ball, a take-up ring adjustably carried by the block and including an internal annular shoulder, a bearing collar confined in the take-up ring and providing a seat for the lower portion of the ball, means engaging said bearing collar and supported by said shoulder for holding the ball in bearing engagement in the seats provided by the bearing cap and the bearing collar, and means providing adjustable threaded connection between the retaining ring and the piston.

4. Means for providing universal connection between a connecting rod and a piston comprising a ball formed on the connecting rod, a block formed in the piston, a bearing cap confined in the block and providing a seat for the upper portion of the ball, a take-up ring adjustably carried by the block and including an internal annular shoulder, a bearing collar confined in the take-up ring inwardly of said shoulder and providing a seat for the lower portion of the ball, resilient means acting against the bearing collar and supported by said shoulder for holding the ball in bearing engagement in the seats provided by the bearing member and the bearing collar, and means providing adjustable threaded connection between the retaining ring and the piston.

In testimony whereof we affix our signatures.

NESTOR S. EVANOFF.
STEVE DOICHINOFF.